United States Patent
Prasad et al.

(10) Patent No.: US 6,917,944 B1
(45) Date of Patent: Jul. 12, 2005

(54) METHOD AND APPARATUS FOR CONFIGURING ACCESS TO A PLURALITY OF DATA REPOSITORIES

(75) Inventors: Ranjan Prasad, Fremont, CA (US); Ramprasad Golla, San Jose, CA (US); Serge Zloto, San Mateo, CA (US)

(73) Assignee: Cisco Technology, Inc., San Jose, CA (US)

( * ) Notice: Subject to any disclaimer, the term of this patent is extended or adjusted under 35 U.S.C. 154(b) by 565 days.

(21) Appl. No.: 09/944,296

(22) Filed: Aug. 30, 2001

(51) Int. Cl.[7] .............................................. G06F 17/30
(52) U.S. Cl. .................. 707/102; 707/104.1; 707/3; 707/4; 707/5
(58) Field of Search .......................... 707/102, 104.1, 707/3, 4, 5, 101, 10, 9, 7; 719/316

(56) References Cited

U.S. PATENT DOCUMENTS

| | | | | |
|---|---|---|---|---|
| 6,275,867 B1 | * | 8/2001 | Bendert et al. ............ | 719/316 |
| 6,490,585 B1 | * | 12/2002 | Hanson et al. ............. | 707/10 |
| 6,516,312 B1 | * | 2/2003 | Kraft et al. ................ | 707/3 |
| 6,629,100 B2 | * | 9/2003 | Morris et al. .............. | 707/10 |
| 6,665,657 B1 | * | 12/2003 | Dibachi ..................... | 707/3 |
| 6,697,808 B1 | * | 2/2004 | Hurwood et al. .......... | 707/10 |
| 6,701,314 B1 | * | 3/2004 | Conover et al. ........... | 707/7 |
| 2002/0152210 A1 | * | 10/2002 | Johnson et al. ............ | 707/9 |

* cited by examiner

Primary Examiner—Frantz Coby
(74) Attorney, Agent, or Firm—Hickman Palermo Truong & Becker LLP

(57) ABSTRACT

A method is provided to configure access to a plurality of data repositories. The data repositories each provide data objects for applications operated by users. A request is received to access data objects in the plurality of data repositories. The request may specify a parameter. Metadata is retrieved that characterizes a portion of the data objects stored in each data repository. One or more objects are selected from the data repositories using the parameter in the request and the metadata.

39 Claims, 10 Drawing Sheets

| AUX ATTRIB | MODIFIED OBJECT(S) | AUX VALUE | INSTRUCT |
|---|---|---|---|
| A1 | $O_{11} O_{12}$ | $\{V_1, V_2, V_N\}$ | F(1) |
| A2 | $O_2$ | $\{W_1, W_2\}$ | F(2) |
| ⋮ | | | |
| An | $O_{2n}$ | $Y_1$ | F(n) |

FIG. 7

| ATTRIBUTE | SUPERIOR OBJECT | RELATED OBJECTS | INSTRUCTIONS |
|---|---|---|---|
| A | $O_{x1}$ | $C_{x1}$ | $f(1)$ |
| B | $O_{x2}$ | $C_{x2}$ | $f(2)$ |
| ⋮ | ⋮ | ⋮ | ⋮ |
| Z | $O_{xz}$ | $C_{xz}$ | $f(z)$ |

FIG. 9

METHOD AND APPARATUS FOR CONFIGURING ACCESS TO A PLURALITY OF DATA REPOSITORIES

FIELD OF INVENTION

The present invention generally relates to communications with data repositories. The invention relates more specifically to configuring access to multiple data repositories of different types and configurations.

BACKGROUND OF THE INVENTION

Data repositories such as databases and directories are increasingly more prevalent as components of network management systems. The increase in use of databases and directories has diversified the configurations of such devices. With directories in particular, many protocols exist to enable access of stored information for use with network components.

Industry standards have been developed to standardize use of repositories such as directory and database components. One industry-sponsored standardized protocol is Lightweight Directory Access Protocol (LDAP), used for accessing data objects in directory devices of a network domain.

Even with standards such as LDAP, directories provided by different vendors and manufacturers are not entirely standard. For example, directory services use common protocols such as LDAP to access and retrieve data, but they may be configured to compile and maintain data using different syntax and data object relationships. This may be the case even though the data provided by different data repositories is intended to be used by the same applications. Because of the differences between even similar data repositories, applications that access multiple data repositories require a lot of user intervention to configure access to each data repository independently. As a result, accessing multiple data repositories can be a cumbersome task for the user of a data application. This problem becomes more pronounced when available data repositories for an application have different vendors and manufacturers.

To provide an example, it is difficult to use a directory-enabled application to access LDAP directories provided by different vendors. The different vendors often use different syntax and relational configurations amongst their data objects. The LDAP directories are different in the manner that data is identified and accessed for auxiliary classes of data objects. In addition, the LDAP directories may differ in the manner linked data objects are treated.

Because of these differences, users of directory-enabled applications typically have to reconfigure access to each LDAP directory using methodologies and programming implemented on the client. Alternatively, the user may sacrifice the quality of access available to the data repositories in order to conserve resources that would otherwise be needed to make non-generic inquiries to the data repositories. The result is that directory-enabled applications are more cumbersome and costly to operate in relation with multiple types of data repositories.

Based on the foregoing, there is a clear need in the field for a way to standardize access to data repositories such as directories and databases.

There is a specific need for a way to provide an intelligent interface that uses an application request to transparently retrieve data from data repositories that may have different configurations, content, format or that may use different protocols.

SUMMARY OF THE INVENTION

Aspects of the invention provide a method for accessing multiple data repositories. According to an aspect, an access service provides an interface to serve requests for data objects stored in the multiple data repositories. A selection criteria or parameter is identified from the request to identify data objects in the different data repositories. The access services stores metadata that can be used to reconfigure the request for different data repositories. The request may be reconfigured to account for differences in data repositories that may result from the data repositories being provided by different vendors, having different configurations to store data, and/or having different protocols and formats.

In other aspects, the invention encompasses a computer apparatus, a computer readable medium, and a carrier wave configured to carry out the foregoing.

BRIEF DESCRIPTION OF THE DRAWINGS

The present invention is illustrated by way of example, and not by way of limitation, in the figures of the accompanying drawings and in which like reference numerals refer to similar elements and in which:

FIG. 7 illustrates a metadata structure for identifying auxiliary classes in a data repository.

FIG. 9 illustrates a metadata structure for identifying data objects sharing an inheritable attribute.

DETAILED DESCRIPTION OF THE PREFERRED EMBODIMENT

Figure 1:
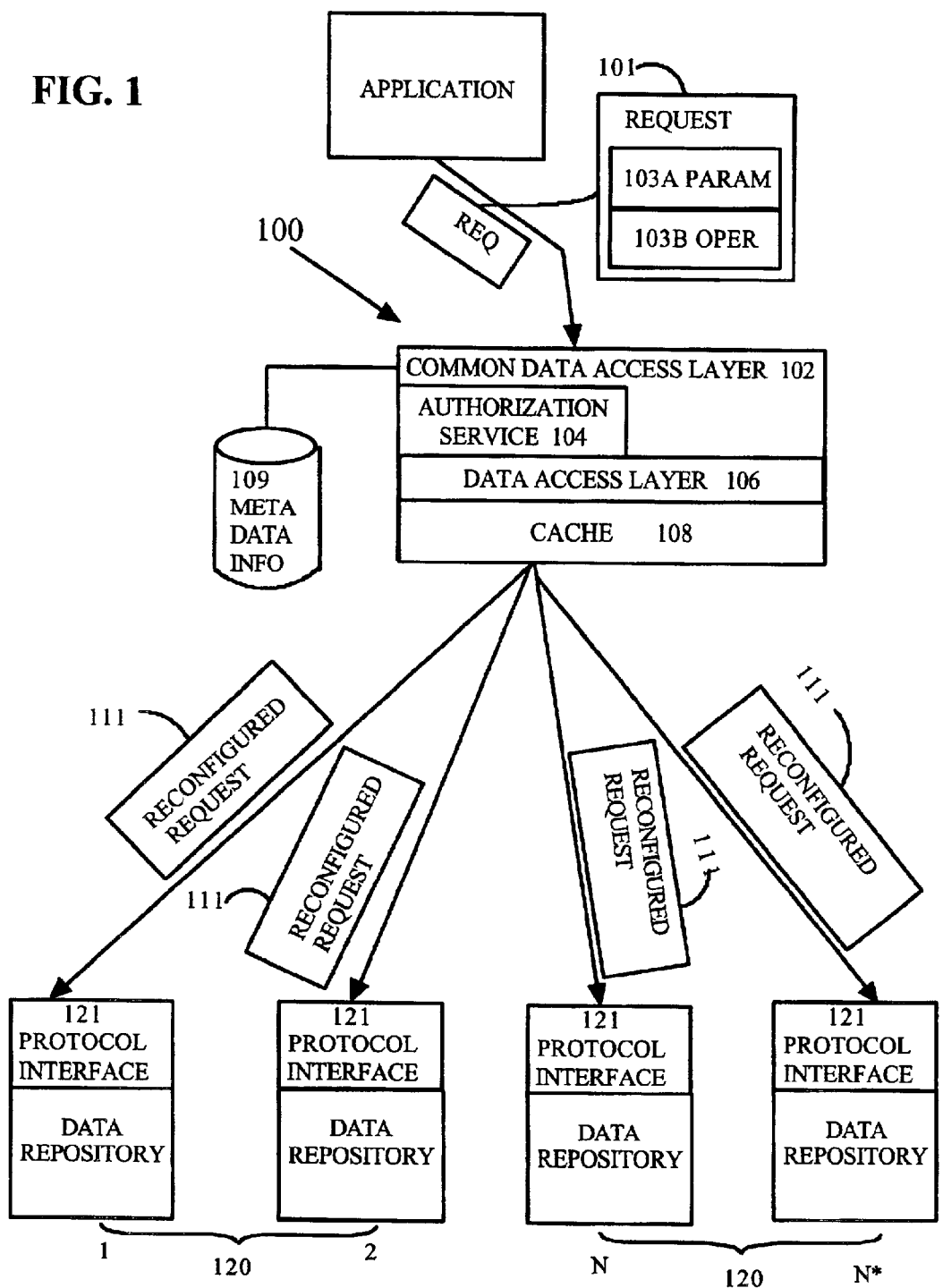
FIG. 1 is a block diagram of a system that includes an access service.

A method and system for configuring access to a plurality of data repositories is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

A. Overview

Embodiments of the invention configure access to a plurality of data repositories. In one embodiment, a request is received from an application to access one or more data repositories. Each data repository includes a plurality of data objects. The data repositories may each have a different configuration for how select data objects relate to other data objects in that data repository. The request includes a parameter. Metadata is identified using the parameter in the request. The metadata characterizes at least a portion of the configuration for each data repository. One or more data objects are selected from the plurality of data repositories using the identified metadata.

A data repository may refer to any storage medium that organizes data objects. An example of a data repository includes a directory, which arranges data objects in a hierarchal fashion. Such a directory may be an LDAP directory, an x.500 directory, or a directory that uses another protocol. Another example of a data repository is a database, which uses a hash structure or similar configuration to associate data objects with characteristics and/or other data objects. Such a database may be a relational database, object database, object-relational database, etc.

Using these embodiments, applications such as directory-enabled programs can be operated in conjunction with multiple data repositories having different configurations and structures. Operations used to access the multiple data repositories are made transparent to the user. The result is that programs can access data without concern for details of the scheme of the repository that holds the data, and ultimately data is provided to users operating such programs with richer semantics and formatting.

In addition, director-enabled programs can be used to access multiple data repositories without requiring the users to account for all differences in amongst the multiple data repositories. For example, in some previous systems, selected few features were identified as common aspect of the different data repositories. Any feature of one or more data repositories that was not one of the common features had to be accounted for separately by the user. Embodiments of the invention allow for an intelligent interface that provides functionality to data repositories to account for the different features between the multiple data repositories. The user does not have to account for the features that are not common to all of the data repositories being accessed.

Data objects may include characteristics and features. Attributes may be used to define at least some of the characteristics and features of data objects. Attributes refer to parameters or variables of a data object. Attributes may have assigned values that define a characteristic or feature of a data object. A class of objects is a set of objects that have a common characteristic or feature. The class of objects, may for example, share a particular attribute.

Metadata refers to information about data. In the context of data repositories, metadata refers to information about data objects in each data repository. Examples of metadata include data object identifiers (names), and sortings of data objects or classes to identify features and characteristics of data objects. The metadata may characterize relationships between data objects, as well as configurations for data objects in a data repository. In an embodiment, relationships between data objects that may be identified or characterized in a data repository by metadata include linkings between data objects, auxiliary classes of objects, and inheritable attributes of objects.

A metadata structure includes a set of compiled metadata that is used to implement a scheme for identifying data objects in multiple data repositories for a particular application request. The metadata structure may include instructions to implement the scheme on the data repositories.

Linked data objects are data objects that have pointers to other data objects. An operation performed on a linked data object also affects one or more counterpart linked data objects. In one configuration, an operation on a linked data object results in the operation being performed on one or more counterpart data objects.

An auxiliary class is a set of attribute values that can be used by one or more data objects. An auxiliary value acts as a modification to an existing value of a data object The addition of an auxiliary value to a data object may change the data object. The auxiliary value can only affect an existing value of an attribute, it cannot exist alone as the value of the attribute.

An inheritable attribute is an attribute shared by a class of data objects. For some data objects of that class, the inheritable attribute is not explicit in the structure of the data object. Rather, the inheritable attribute is an inherent characteristic or feature of the data object that stems from another object having that same feature. In one directory implementation, the inheritable attribute is shared by a superior data object and a plurality of subordinate data objects. The inheritable attribute may also be shared by related data objects which are not subordinate or superior to one another.

Another embodiment of the invention provides for a computer system that communicates with multiple data repositories. The computer system may be used to process a request to access the data repositories. A storage medium of the computer system stores one or more metadata structures, including a first metadata structure that characterizes multiple data objects in each data repository. The computer system includes processing resources that are configured to use the one or more metadata structures to select data objects from the combination of data repositories. The data objects are selected as a response to the request to access the data repositories.

A data repository, metadata, metadata structure, data object, directory, database, domain, policy and other elements described herein may be represented in the form of one or more data representations, abstract data structures, or other information that is created and stored in a computer-readable medium, and managed by one or more software elements. Such data representations may be processed by a network management station, policy manager, or other processor to accomplish the methods described herein B. System Description FIG. 1 is a block diagram of a system that includes an access service. An access service 100 is provided to interface an application 110 with a plurality of data repositories 120. The access service 100 may be implemented on a server machine, accessible to clients over a network.

The data repositories 120 store a plurality of data objects. One or more data repositories 120 may be LDAP directories.

The application 110 may be a directory-enabled program operated on a client to utilize data objects in the data repositories 120. In an embodiment, it is possible for multiple directory-enabled (or database enabled) applications to interface with data repositories 120 using access service 100.

The access service 100 provides an interface for uniform access to data repositories 120 that differ in configurations and content. For example, the data repositories 120 may be structured as LDAP directories that differ in semantics, syntax, and stored object relationships. Such differences may become even more complex if the data repositories 120 are provided by different vendors. Furthermore, data repositories 120 may be compiled or built to store similar information, but data objects providing the information may be interrelated according to different configurations. The access service 100 is equipped to configure applications requests to handle the differences between the data repositories 120. In one embodiment, the access service 120 interfaces with application 110 so that access to different data repositories 120 may be accomplished in a manner that is transparent to client 114.

The access service 100 abstracts differences in objects and interrelationships between data objects of data repositories 120, as well as differences in syntax, semantics, and data object relationships of the data repositories 120. These differences are abstracted into metadata information. The metadata information may be used to select data objects from one or more of the data repositories 120 for access requests signaled from application 110.

In an embodiment, access service 100 includes a common data access (CDA) layer 102, an authorization layer 104, and a data access layer 106. The CDA layer 102 receives requests from application 110. A request 101 from application 110 may specify one or more parameters 103A to define a particular class of data objects. The request 101 may also include an operation 103B that is to be performed on the class of requested data objects. The operation may comprise, for example, read, write, delete, or modify operations.

In response to a request, CDA layer 102 identifies metadata information for each data repository 120. The metadata information is used to select data objects from data repositories 120 that match the parameter of request 101.

The authorization layer 104 authorizes a user of client 114, in case access to data repositories 120 is secured. The authorization process may include authentication. In one embodiment, the authorization process includes authenticating users to verify their identities, and identifying a policy granting privileges to access data repositories for that user.

The data access layer 106 communicates with protocol interfaces 121 of data repositories 120. The data access layer 106 may signal a reconfigured request 111 to each data repository 120. A response (see FIG. 2) includes data objects that meet the parameters of request 101, or pointers to such as data objects.

The protocol interfaces 121 may be supplied by vendors or manufacturers of the data repositories 120. In addition, data access layer 106 may manage a cache 108 for data objects accessed by the access service 100. The cache 108 may store data objects that were previously retrieved for subsequent use with other requests from application 102, or from other applications and clients.

Figure 2:
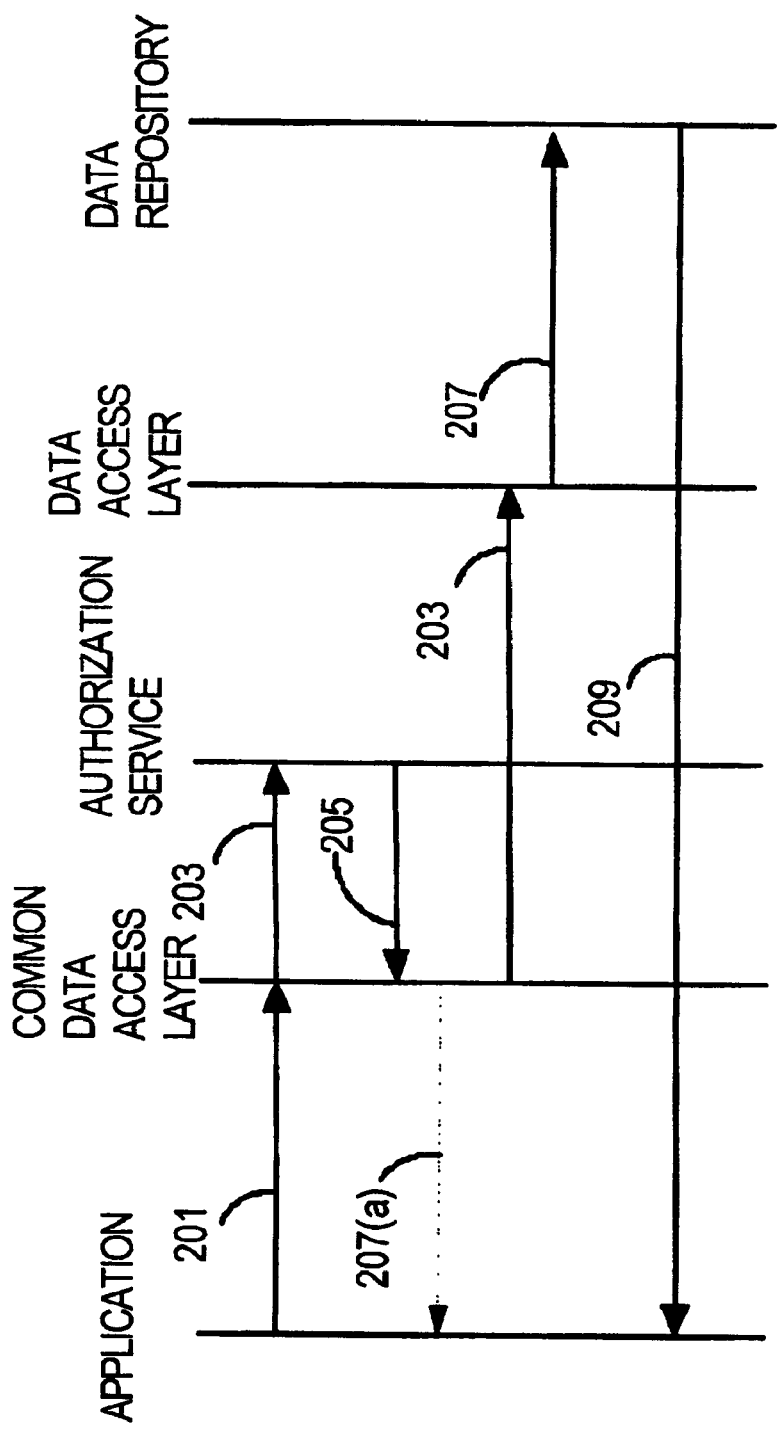
FIG. 2 is a sequence diagram for functions of an access service.

FIG. 2 is a sequence diagram for functions of an access service.

The application 110 signals a request 201 to access one or more data objects stored in one or more of the data repositories 120. The request is received by CDA layer 102. The request may include parameter(s) 103A and operation(s) 103B.

In an embodiment, data repositories 120 are completely or partially secured. Therefore, optionally, CDA layer 102 receives identification information from request 201 and signals an authorization request 203 to authorization service 104. The authorization service 104 may use the identification information of request 201 to authenticate the user on application 110, as well as to verify that the user is allowed access to the required portions of data repositories 120. The authorization service 104 returns an authorization response 205 to the request 203. If the response 205 is a denial, signal 207a forwards the denial from CDA layer 102 to application 110.

If the response 205 is an approval, CDA layer 102 signals data access layer 106 forwards the request 203 for access to select data objects of data repositories 120. The data access layer 106 reconfigures the request 203. The data access layer 106 generates a reconfigured request 207 by mapping the request parameter and operation to metadata. The reconfigured request 207 may also include schema for one or more repositories that is identified using the metadata, the request parameter(s) 103A and/or operation(s) 103B.

The data access layer 106 may signal reconfigured request 207 to one or more data repositories. The metadata information of the reconfigured request 207 accounts for differences in configurations amongst each data repository 120 by describing data in the repositories in an abstract manner. As will be further described, the metadata information may identify linked data objects, auxiliary classes, and classes of data objects sharing inheritable attributes, for each data repository 120. In addition, the reconfigured request 207 may carry instructions on how data objects identified by the metadata information are to be handled. The instructions may be particular to the operation specified in request 201, signaled by application 110. In an embodiment, data access layer 106 tries cache 108 before signaling the reconfigured request to the data repositories.

The reconfigured request 207 may communicate with one data repository 120 using Common Object Request Broker Architecture (CORBA) messages, and communicate with another data repository using Open DataBase Connectivity (ODBC) communications. The data access layer 106 may also communicate with databases, rather than directories, using Structured Query Language (SQL).

A response 209 from each data repository 120 may be returned to application 110. The response may be positive or negative. A positive response means that data objects were located that matched request 201. A negative response means no data objects were located that matched request 201.

If the response is positive, the content of response 209 may depend on the operation specified by request 201. If the operation of request 201 is a read (data objects), response 209 carried data objects, or alternatively, location information to locate each data object in the data repositories 120. If the operation of request 201 is a write, modify or delete, response 209 is a confirmation that the operation was performed on data objects that matched the parameter of request 201. The response 209 may also carry the altered data objects, or an indication of the state of the data objects after the operation was performed.

In an embodiment, data access layer 106 also communicates with cache 108 to determine whether data objects matching the user's request are stored there. If the data objects are cached, the user's request to retrieve those data objects may be processed more quickly. Therefore, one of the communications in request 209 may only extend to cache 108. The cache 108 may be purged from time to time to ensure data objects stored there are current.

C. Methods For Implementing Embodiments

Figure 3:
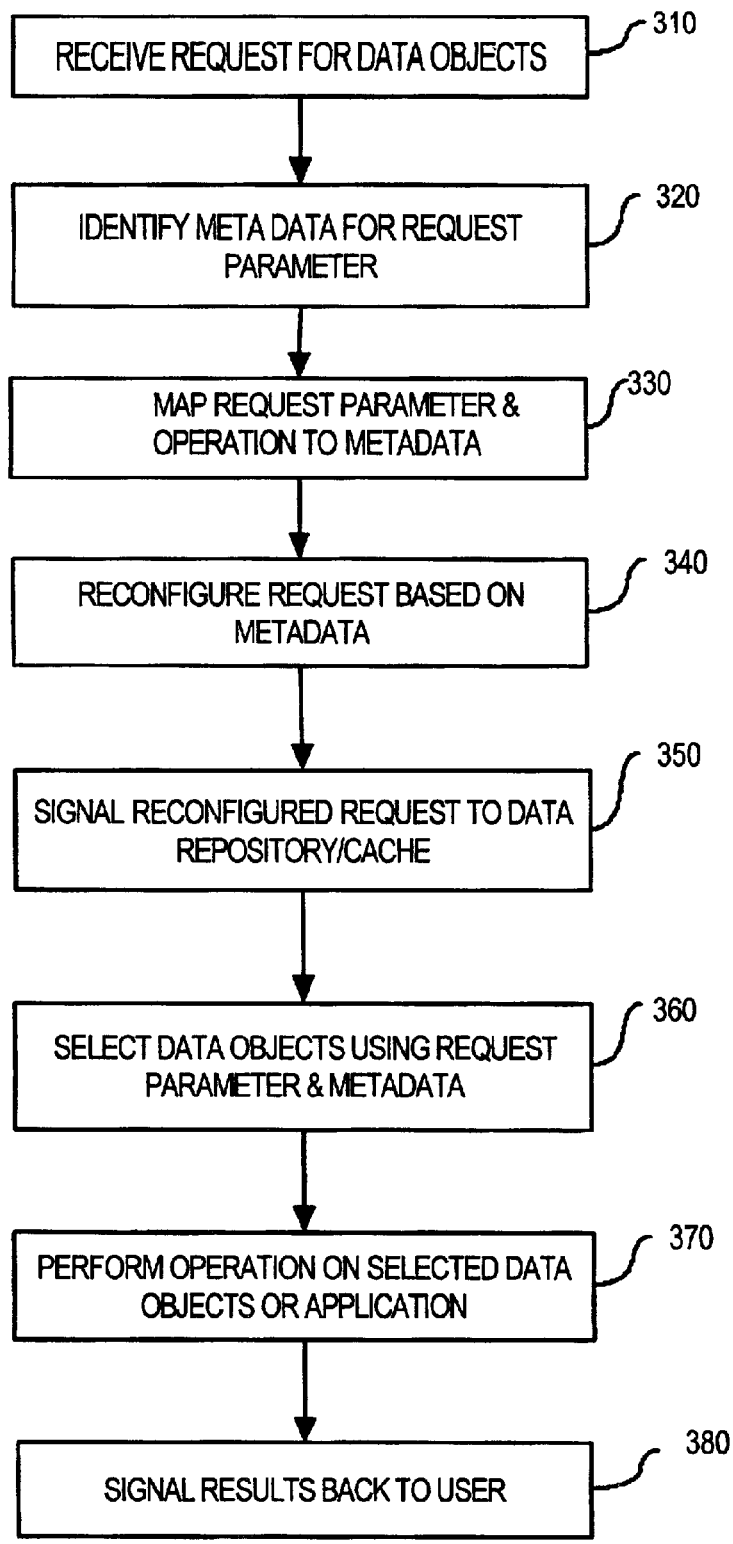
FIG. 3 illustrates a method for using metadata information to configure access to multiple data repositories.
Figure 4:
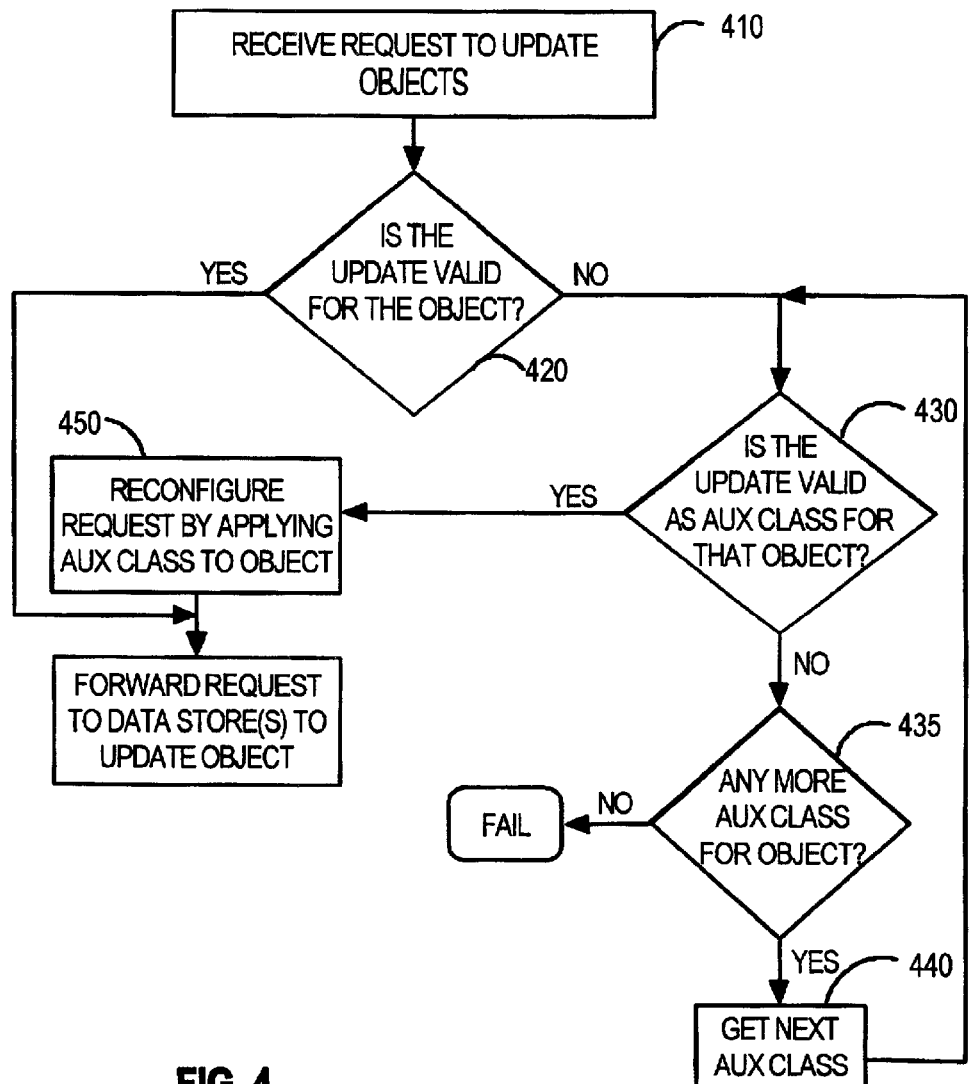
FIG. 4 illustrates a method for using metadata information to configure access to data objects that may be part of an auxiliary class of a data repository.
Figure 5:
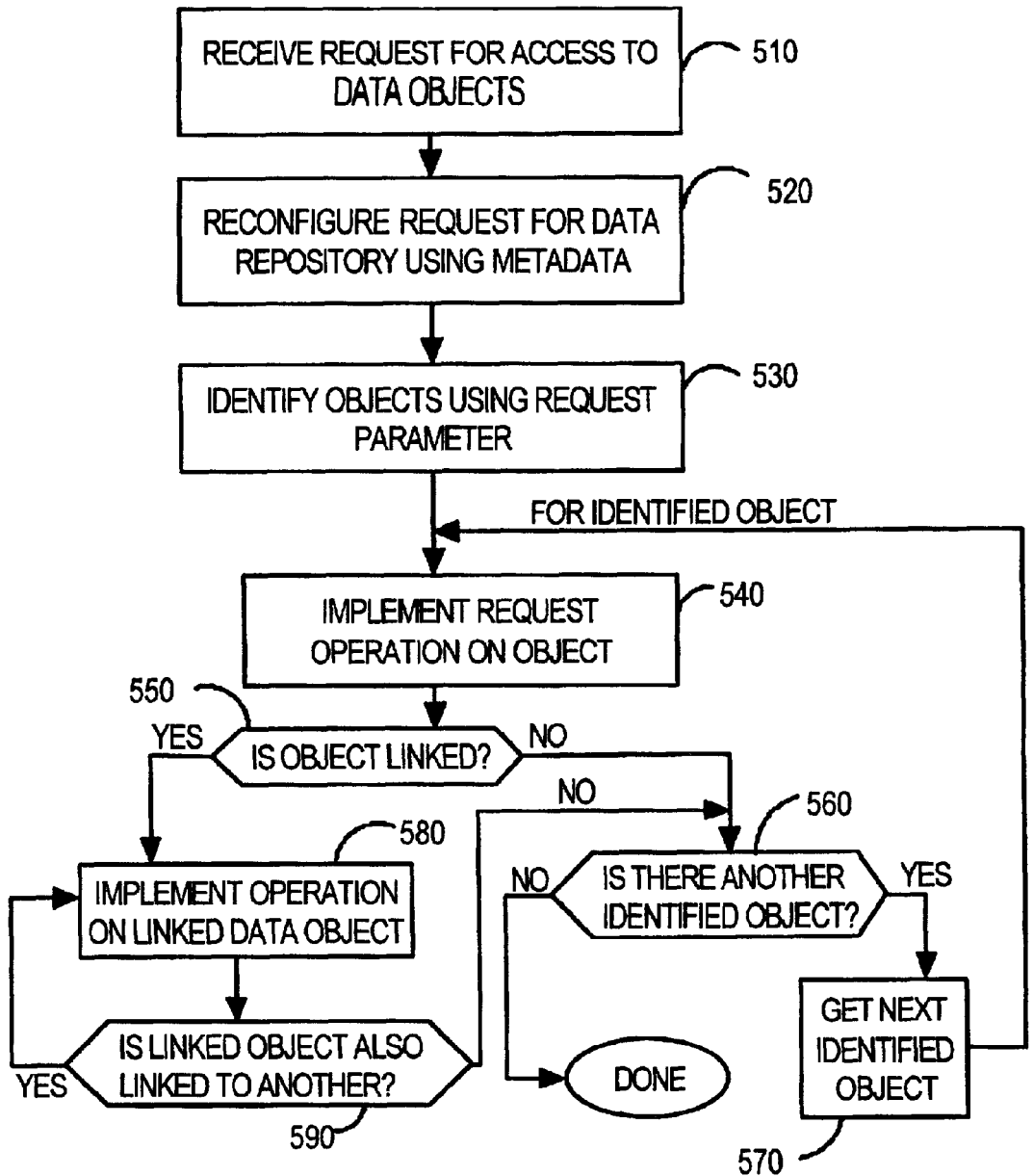
FIG. 5 illustrates a method for using metadata information to configure access to linked data objects of a data repository.
Figure 6:
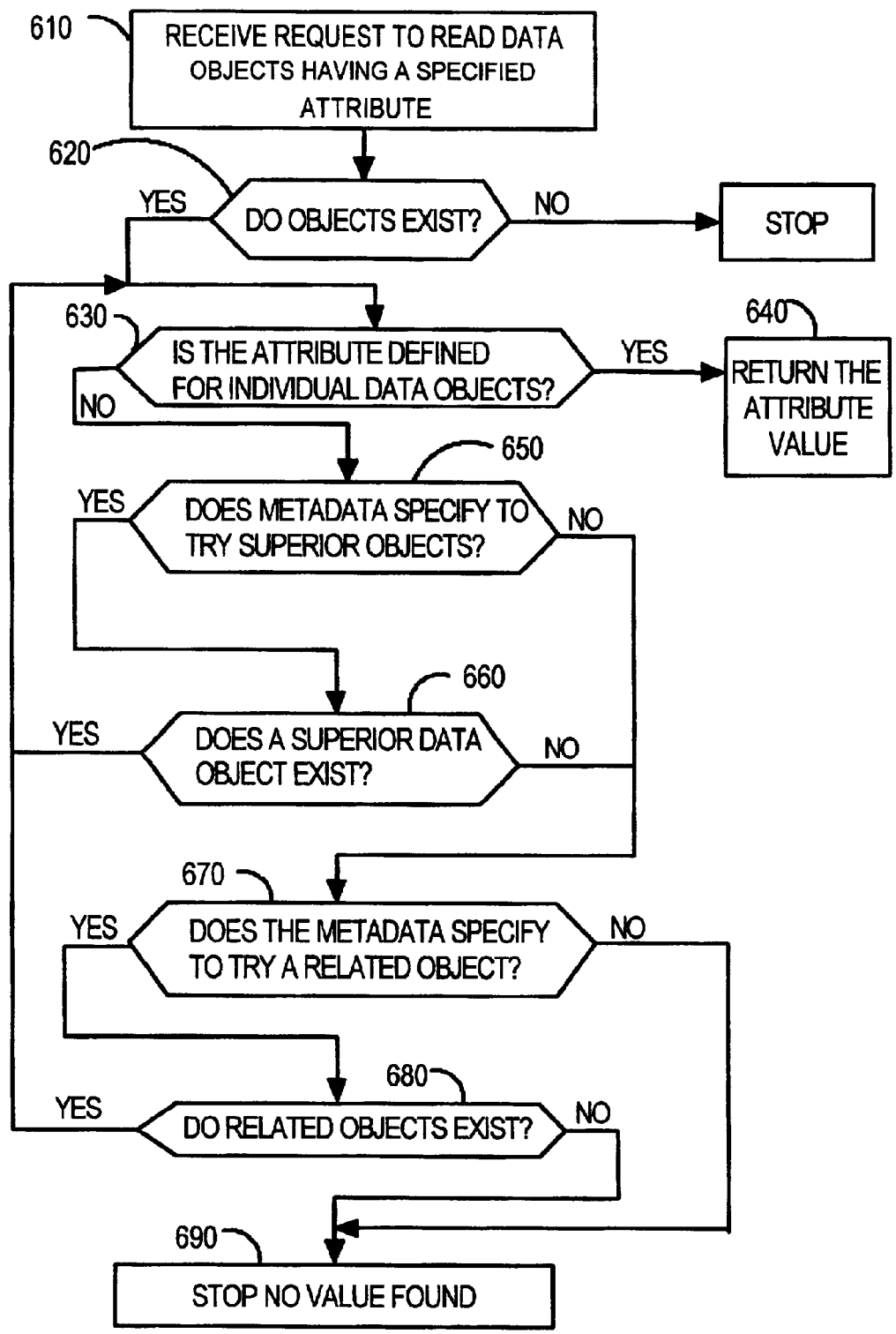
FIG. 6 illustrates a method for using metadata information to configure access to data objects with inheritable attributes.

FIG. 3 illustrates a method for using metadata information to configure access to multiple data repositories. FIG. 4 illustrates a method for using metadata information to configure access to data objects that may be part of an auxiliary class of a data repository. FIG. 5 illustrates a method for using metadata information to configure access to linked data objects of a data repository. FIG. 6 illustrates a method for using metadata information to configure access to data objects with inheritable attributes.

For purpose of illustrating a simple example, the methods of FIG. 3, FIG. 4, FIG. 5 and FIG. 6 are described herein in the context of FIG. 1 and elements of FIG. 1. However, the methods of FIG. 3, FIG. 4, FIG. 5 and FIG. 6 are not limited to that specific context, but are broadly applicable for purposes identified in this disclosure.

FIG. 3 illustrates a method for using metadata information to configure access to multiple data repositories. In step 310, a request is received from a user for data objects stored in data repositories 120. The request may be signaled from clients where directory-enabled or database applications are being executed. The requests may specify user-parameters to define a criteria for selecting data objects. In addition, the request may specify the manner in which the data objects are to be accessed. For example, the request may specify an operation such as read, write, or modify data objects in the data repositories 120.

In step 320, metadata information is identified from the request. The metadata information may be derived from the configurations of data repositories 120. The parameter of the request may identify particular metadata information to complete the user's request.

In step 330, metadata and a scheme may be identified by mapping the request parameter and operation to metadata stored for data repositories 120. The request parameter, operation and/or metadata may also be mapped to a specific scheme for different data repositories.

In step 340, the user's request is reconfigured using the identified metadata information. The user's request may also be reconfigured from the identified scheme for the metadata information. The reconfigured request carries instructions for selecting data objects based on parameters provided in the user's request. The instructions are derived from or included as part of the metadata information.

In step 350, the reconfigured request is signaled to either the data repositories 120 or to the cache 108. When signaled, the reconfigured request is formatted in a language and/or protocol that is specific to each type of data repository 120. In particular, the language and/or type of protocol is specific to the version, manufacturer or vendor of each data repository 120.

In step 360, data objects that match the request's parameters are selected. The selection process may be performed by metadata information and instructions that are signaled to interfaces of each data repository 120. Intelligence in each data repository 120 may locate data objects using the metadata information and instructions. The metadata may be presented to the data repositories 120 in a format that each data repository 120 can understand. The metadata may also be structured to implement a scheme for selecting data objects.

In step 370, an operation specified in the user's request is performed on the selected data objects. In one implementation, the operation is a read, where data objects are selected and copied to be signaled back to the client. In another implementation, the operation specified in the user's request is a modify or delete. The selected data objects may be modified in or deleted from the data repositories 120 where they reside. Still further, another embodiment may specify to create or replicate data objects if data objects specified in the parameter are located.

In step 380, the results of the user's request are signaled back to the client. The result may be signaled to the user from an intermediate component between the client and the data repository 120. The intermediate component may be data access layer 100. The data access layer may, for example, implement some metadata onto the response received from data repositories 120 to present the result to the user. Alternatively, data repositories 120 may communicate with the client directly to provide the response to the user's request. The results may indicate data objects that were located from one or more of the data repositories 120. For example, the result may provide a viewable copy of the data objects, or a confirmation that an operation in the user's request were performed on identified data objects that matched the user's parameter. The result may also indicate that no data objects were selected because none of the data objects matched the user's request.

FIG. 4 illustrates a method for using metadata information to configure access to data objects that may be part of an auxiliary class. A method such as shown by FIG. 4 determines whether a user's request involves an auxiliary class of data objects, so that the auxiliary class in the data repositories are accounted for to satisfy the user's request. The method provided in FIG. 4 may be performed on access server 100, in response to a request from client 115.

In step 410, a user's request is received to update or modify selected data objects in data repositories 120. The request may specify parameters to identify data objects in the data stores. The request may seek to update data objects in an object class by adding an attribute or attribute value.

In step 420, a determination is made as to whether the update to the object class is valid. That is, a determination is made as to whether the attribute or attribute value can be added to the data objects of the object class.

If the determination in step 420 is negative, then a determination is made in step 430 as to whether the update is valid for an auxiliary class of the object class. If the determination in step 430 is negative, then in step 435 a determination is made as to whether there is another auxiliary class for the object class specified in the request. If the determination in step 435 is positive, then step 440 provides that the next auxiliary class is identified, and the process returns to step 430. If the determination in step 440 is negative, then step 440 provides that the update fails.

If the determination in step 430 is positive, then step 450 provides that the user's request is reconfigured by applying the auxiliary class identified in that step to the specified data objects of the request. The auxiliary class may be applied by adding an attribute to the specified data objects. The auxiliary class may be also be applied by adding an attribute value to an existing attribute.

If the determination in step 420 is that the update is valid for the object class, then step 460 provides that the request is forwarded for the data repositories 120. Alternatively, if an auxiliary class was applied to the specified data objects, then step 460 provides for signaling the reconfigured request of step 450 to the data repositories 120. In either case, the request may first be signaled to data access layer 106 to be converted into a format and protocol for the data repositories 120. The request to access data objects for updating is then applied at the different data repositories.

For example, an object class may correspond to employees. Each employee corresponds to a data object of that object class. The employees may have two attributes-a first name and a surname. Manager can be an auxiliary class having one attribute-department name. The request in step 410 may identify specific employees (objects) and seek to add the department name attribute to the objects. The method of FIG. 4 determines whether a department name is a valid attribute of the object class for employees. If department name is not valid for the employee class by itself, the method determines whether there is an auxiliary class that can be added to the object class. The method may identify that manager is in fact an auxiliary class that can be added to the employee object.

FIG. 5 illustrates a method for using metadata information to configure access to linked data objects of a data repository. The linked objects have pointers to other linked objects. Therefore, an operation on one linked object may also need to be performed or at least considered on a counterpart to the linked object to reflect an accurate result.

In step 510, a request to access data objects is received from application 110. The request specifies an operation and a parameter for selecting data objects. The operation may include, for example, a read, write, update, or delete operation.

In step 520, the request is reconfigured to include metadata information that identifies linked data objects. The metadata may also be structured to execute instructions for locating linked data objects on one or more of the data repositories 120. The metadata information may identify specific data objects or object classes that are linked for one or more of the data repositories 120. Furthermore, the metadata may carry instructions for how those linked data objects are to be treated. In an embodiment such as described, the metadata information identifies object classes and/or specific objects that are linked. The metadata information carries instructions to treat linked objects the same as those identified from use of the parameters.

In step 530, data objects are identified that correspond to the request parameter. This step may be performed at least partially on the data repositories 120. Then in step 540, the operation is implemented on the identified data object from the previous step In step 550, a determination is made as to whether each identified data object from steps 530 and 540 is linked to another data object. This determination may be made using the metadata information of the reconfigured request.

If the determination in step 550 is that an identified data object is not linked, then another determination is made in step 560 as to whether there is another identified data object from step 530. If there are no other data objects, then the method is done. If there are other data objects, step 570 provides that the method proceed to the next identified data object. The method is repeated at step 540.

If the determination in step 550 is that an identified data object is linked, then step 570 provides that the operation is implemented on the data object that is linked to the identified data object from 530. Then in step 580, another determination is made as to whether the linked data object is also linked. If the linked data object is linked, then step 570 is repeated until there are no linked data objects. Then the method performs step 560.

While an embodiment described with FIG. 5 describes as linked data objects being operated on in the same manner as data objects identified from the request parameter, other embodiments may distinguish the treatment of data objects located by links from those located by request parameters. For example, in one embodiment, a request to update select data objects may result in data objects matching the parameter of the request being updated. Data objects linked to those identified objects may be read back to the user to give the user the option of updating linked data objects as well.

FIG. 6 illustrates a method for using metadata information to configure access to data objects with inheritable attributes. The inheritable attributes are those that may not be explicitly stated in a data object, but present nevertheless as an inherited feature from a superior data object.

In step 610, a request is received to read data objects having a specified attribute. The request may be received by the access service 100. In step 620, access service 100 makes a determination as whether data objects exist having the specified attribute as a feature. If the determination is that no such data objects exist in the data repositories, the method is stopped.

If the determination in step 620 is that the attribute exists for data objects in data repositories 120, then step 630 determines whether the specified attribute is defined in the structure of the individual data objects. In other words, the determination is whether explicit coding exists in individual data objects that assign the specified attribute to that data object. If the determination in step 630 is positive, then step 640 provides that the values of the specified attributes in the individual data objects are to be returned.

If the determination in step 630 is negative, then step 650 determines whether there is metadata that indicates the attribute is located in superior data objects of the data repository. In a directory type data structure, one object's superior data objects is upline and in the same tree.

If step 650 determines that there is metadata to indicate the attribute is located in a superior data object, then step 660 determines whether a superior data object does exist. If the superior data object exists, step 660 repeats the method at step 630, with the superior data object being treated as the individual data object. This steps 630 to 660 may repeat, so that data objects are progressively checked upline until a superior data object is located having the inheritable attribute.

If step 660 determines that a superior data object does not exist, then step 670 follows. Step 670 also follows if step 650 determines that metadata does not specify to check superior data objects. Step 670 determines whether the metadata specifies to try a related data object. A related data object may be down stream and in the same tree, or in a parallel tree. If the determination is positive, then step 680 determines whether related data objects exist.

If step 680 determines related objects do not exist, then step 690 stops the method. Step 690 also follows step 670 if it is determined that the metadata does not specify to try a related data object.

If step 680 determines related objects do exist, then the method is repeated from step 630. The individual data object sent through the method is the related data object identified by step 680.

In a method such as described with FIG. 6, access service 100 provides metadata that knows whether an attribute specified by a request parameter is inheritable. In addition, the metadata may determine whether a data object identified from the request parameter has an inheritable attribute that requires consideration of other data objects for an operation related to the user's request. The metadata may be carried over from access service 100 to data repositories 120. The metadata may be carried over with instructions to implement a method such as described with FIG. 6 on data objects in data repositories 120.

D. Illustrative Data Structures

Figure 8:
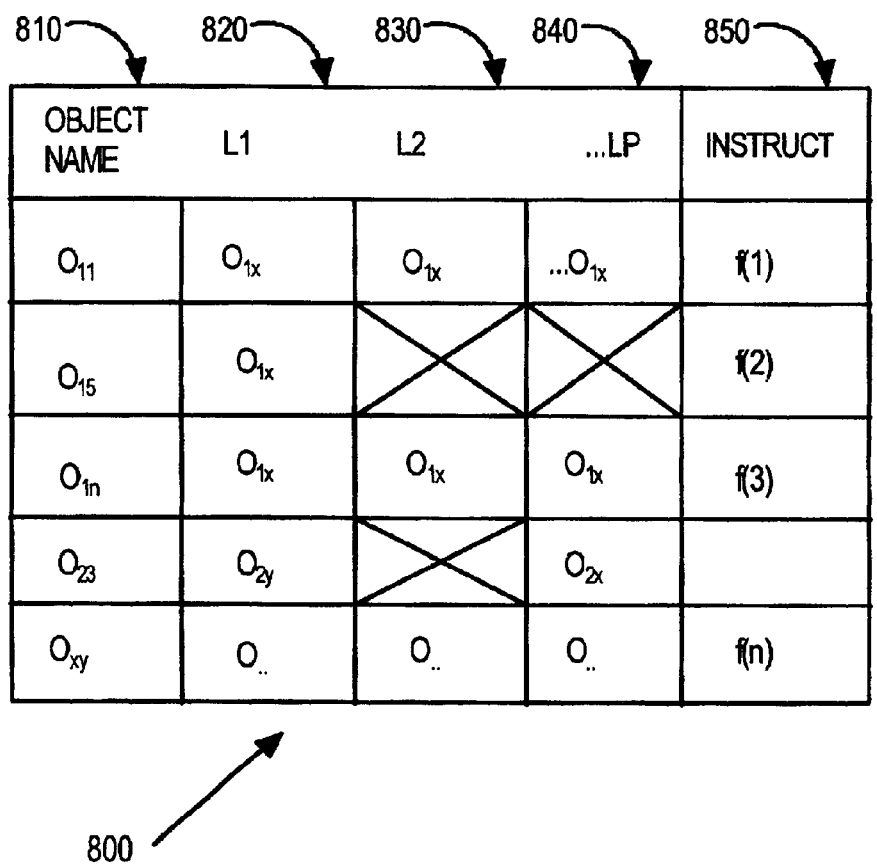
FIG. 8 illustrates a metadata structure for identifying linked data objects in a data repository.

FIG. 7, FIG. 8 and FIG. 9 show illustrative metadata structures and schemes for use with embodiments of the invention. The metadata structures are intended to illustrate specific examples of metadata information, and how that metadata information is used to interface applications with data repositories that include features such as auxiliary data classes, linked objects and inheritable attributes.

FIG. 7 illustrates a metadata structure 700 for identifying auxiliary classes in a data repository. In an embodiment metadata structure 700 includes metadata information and possible instructions for carrying out a scheme. The scheme may be for performing some steps in a method such as described with FIG. 6.

The metadata information relates auxiliary attributes with identifiers to data objects. The first column 710 lists auxiliary classes for the data objects in the data repositories 120. The second column 720 includes object identifiers. The object identifiers may be in the form of distinguished names, or in terms of an object class that selects a group of data objects. The third column 730 of the metadata structure 700 lists possible values for attributes that can carry the auxiliary values. The fourth column 740 shows that instructions may be included for specific auxiliary classes.

In one embodiment, auxiliary classes are existing attributes that can be modified with an auxiliary value. For example:

OBJECT 11
ATTRIB1: VAL1
ATTRIB2: VAL2+AUX1

In the example, data OBJECT 11 is stored in a directory and has attributes (ATTRIB1 and ATTRIB2). The attributes may have existing values (VAL1 and VAL2). The aux class may add an aux value (AUX1) to one of the attributes. The aux value does not replace VAL2, but modifies ATTRIB2 to include VAL2 and AUX1 as values. In the example provided, AUX1 is a value identified in first column 710. The value VAL2 is identified in third column 730.

The instructions in fourth column 740 are to assist implementation of a scheme when data objects are being selected. The instructions may, for example, be used to carry one or more steps in a method shown by FIG. 4. The instructions may also distinguish the scheme for different operations specified in the application request For example, the instructions may signal to treat read operations differently than update operations for auxiliary classes.

Several variations are possible. For example, metadata structure 700 may not identify objects that have potential to include an auxiliary class, but the metadata structure may rely only on identifying attributes that can be modified by auxiliary values. As a method such as described with FIG. 6 is implemented, the metadata structure 700 checks for attributes that may be auxiliary classes before determining results from the application request. Other embodiments may provide for the auxiliary class to provide new attributes, rather than modify existing attributes.

FIG. 8 illustrates a metadata structure for identifying linked data objects in a data repository. A metadata structure 800 references a first column 810 listing an identifier of a linked data object. A linked data object includes in its structure a reference to at least one other data object, referred to as counterpart objects. The counterpart data object(s) for each linked data object are listed in columns 820 through 840. Column 850 may be provided to carry instructions for implementing a scheme with the metadata information of structure 800.

An example of a linked object is:
LINKED_OBJ1
ATTRIB: . . .
ATTRIB . . . .
<OBJ2, OBJ3>

In this example, the identifier LINKED_OBJ1 is the name of the object and listed in column 810. The referenced or counterpart objects (<OBJ2, OBJ3>) may be referenced in columns 820 and 830. The instructions in column 850 may be used to perform one or more steps in FIG. 5. Also, the instructions may be used to inform the processing resource performing the operation that linked objects and counterparts are to be treated differently, depending on the operation specified in the application request. For example, access service 100 may be configured by the instructions in column 850 to return counterparts to linked objects if the operation of the application request is a read, but access service 100 may be instructed to not return the counterpart objects if the operation is an update.

FIG. 9 illustrates a metadata structure 900 for identifying data objects sharing an inheritable attribute. A first column 910 of metadata structure 900 includes an identifier to an inheritable attribute. A second set of columns 920 may list superior data objects that may have the inheritable attribute in an explicit form. A third column 930 includes related objects that may have the inheritable attribute implicitly or explicitly included. The fourth column 940 includes instructions for implementing a scheme using metadata structure 900.

An example of metadata structure 900 may be provided by:

OBJ 11
ATTRIB1: INHERITABLE
OBJ 12
ATTRIB2: XXX

In this example, OBJ 11 is assumed to be a superior to OBJ 12 in a directory type data repository. If OBJ 11 has an inheritable attribute, OBJ 12 may be assumed to have it, even though the attribute is only explicit in OBJ 11. The inheritable attribute (ATTRIB1) is listed in column 910. The superior object (OBJ 11) is listed in column 920. The related object is listed in column 930. The instructions in column 940 are to implement one or more steps in a method such as described with FIG. 5. Alternatively, the instructions may be used to configure special instructions for data repositories 120. For example, the instructions in column 940 may be used to distinguish how the identified inheritable attributes are to be treated for different operations in the application request.

E. Hardware Overview

Figure 10:
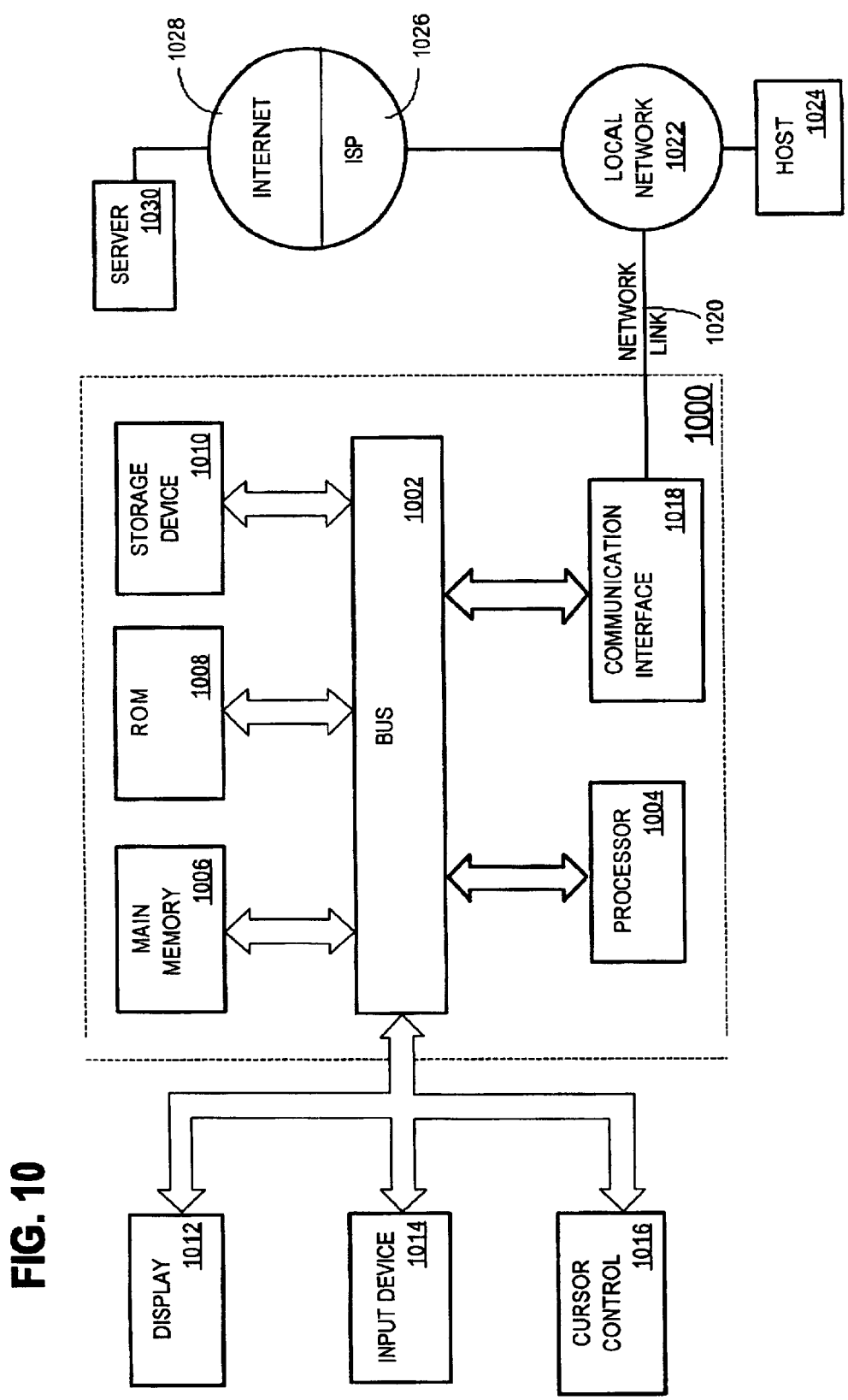
FIG. 10 is a block diagram that illustrates a computer system upon which an embodiment may be implemented.

FIG. 10 is a block diagram that illustrates a computer system 1000 upon which an embodiment of the invention may be implemented.

Computer system 1000 includes a bus 1002 or other communication mechanism for communicating information, and a processor 1004 coupled with bus 1002 for processing information. Computer system 1000 also includes a main memory 1006, such as a random access memory ("RAM") or other dynamic data repository, coupled to bus 1002 for storing information and instructions to be executed by processor 1004. Main memory 1006 also may be used for storing temporary variables or other intermediate information during execution of instructions to be executed by processor 1004. Computer system 1000 further includes a read only memory ("ROM") 1008 or other static data repository coupled to bus 1002 for storing static information and instructions for processor 1004. A data repository 1010, such as a magnetic disk or optical disk, is provided and coupled to bus 1002 for storing information and instructions.

Computer system 1000 may be coupled via bus 1002 to a display 1012, such as a cathode ray tube ("CRT"), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

The invention is related to the use of computer system 1000 for configuring access to multiple data repositories. According to one embodiment of the invention, configuring access to data repositories is provided by computer system 1000 in response to processor 1004 executing one or more sequences of one or more instructions contained in main memory 1006. Such instructions may be read into main memory 1006 from another computer-readable medium, such as data repository 1010. Execution of the sequences of instructions contained in main memory 1006 causes processor 1004 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1004 for execution. Such a medium may take many forms, including but not limited to, non-volatile media, volatile media, and transmission media Non-volatile media includes, for example, optical or magnetic disks, such as data repository 1010. Volatile media includes dynamic memory, such as main memory 1006. Transmission media includes coaxial cables, copper wire and fiber optics, including the wires that comprise bus 1002. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on data repository 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network ("ISDN") card or a modem to provide a data communication connection to a corresponding type of telephone line. As another example, communication interface 1018 may be a local area network ("LAN") card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider ("ISP") 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are exemplary forms of carrier waves transporting the information.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. In accordance with the invention, one such downloaded application provides for configuring access to data repositories as described herein.

The received code may be executed by processor 1004 as it is received, and/or stored in data repository 1010, or other non-volatile storage for later execution. In this manner, computer system 1000 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for accessing data objects from a data repository from a plurality of data repositories that each comprises a plurality of data objects, the method comprising:

receiving a request to access data objects stored in a specified one of the plurality of data repositories, the request including a parameter that specifies the data objects;

wherein at least two of the plurality of data repositories are configured with different data objects and data object relationships;

identifying, based on the parameter, metadata that characterizes at least a portion of the data objects in the specified data repository, from a plurality of metadata that each characterizes a configuration for the data objects in a data repository;

retrieving the metadata that characterizes at least a portion of the plurality of data objects in the specified data repository;

generating, based on the metadata that characterizes at least a portion of the plurality of data objects in the specified data repository, a reconfigured request to access the data objects stored in the specified data repository; and using the reconfigured request, signaling a selection for one or more data objects from the specified data repository.

2. The method of claim 1,
wherein signaling a selection for one or more data objects from the specified data repository includes:
modifying the one or more data objects from the specified data repository using the reconfigured request.

3. The method of claim 1,
wherein signaling a selection for one or more data objects from specified data repository includes:
deleting the selected one or more data objects from the specified data repository using the reconfigured request.

4. The method of claim 1,
wherein signaling a selection for one or more data objects from the specified data repository includes:
creating one or more data objects using the reconfigured request, the data objects being created in the specified data repository according to the configuration for the data objects in the specified data repository.

5. The method of claim 1, wherein identifying metadata based on the parameter in the request includes accessing a storage medium to retrieve metadata specified by the parameter in the request.

6. The method of claim 1, wherein retrieving metadata includes identifying, from the request, metadata that characterizes a configuration for data objects in each data repository, the configuration of each data repository indicating a class of data objects in each data repository that share an attribute.

7. The method of claim 1, wherein retrieving metadata includes identifying, from the request, metadata that characterizes a configuration for data objects in each data repository, the configuration of each data repository indicating an auxiliary class of data objects.

8. The method of claim 1,
wherein retrieving metadata includes identifying a metadata structure from the request that identifies a plurality of auxiliary classes for each data repository; and
wherein signaling a selection for one or more data objects includes determining whether the parameter is a valid feature of at least one of the plurality of auxiliary classes.

9. The method of claim 1, further comprising:
identifying one or more auxiliary classes for each data repository, each auxiliary class including at least one data object having an attribute and a value for that attribute, the value for that attribute further being modified by an auxiliary value that can only be associated with the attribute by modifying the value of that attribute; and
associating a metadata structure with each auxiliary class;
wherein retrieving metadata includes identifying the metadata structure from the request that identifies the one or more auxiliary classes for each data repository; and
wherein signaling a selection includes signaling a selection for one or more data objects from the plurality of data repositories including determining whether the parameter is valid for the attribute, the value for the attribute, or the auxiliary value for the attribute.

10. The method of claim 1, wherein retrieving metadata includes identifying, from the request, metadata that characterizes a configuration for data objects in each data repository, the configuration of each data repository indicating select data objects of each data repository that are linked to other data objects.

11. The method of claim 1, wherein retrieving metadata includes identifying, from the request, metadata that identifies a plurality of linked data objects for each data repository, each of the plurality of linked data objects referencing another data object in the data repository; and
wherein the method further includes associating the metadata structure with the plurality of linked data objects.

12. The method of claim 1,
wherein retrieving metadata includes identifying, from the request, a metadata structure that identifies a plurality of linked data objects for each data repository, each linked data object referencing a counterpart data object in the data repository; and
wherein signaling a selection includes signaling a selection for one or more linked data objects, and using the metadata structure to identify the counterpart data object referenced by each linked data object.

13. The method of claim 1,
wherein retrieving metadata includes, from the request, a metadata structure that identifies an inheritable attribute for a plurality of data objects in at least one of the plurality of data repositories, the inheritable attribute being located in at least one superior data object; and
wherein signaling a selection includes determining that the parameter specifies the inheritable attribute, and selecting a class of data objects that share the inheritable attribute.

14. A computer system coupleable to an application and to a plurality of data repositories, the application signaling the computer system a request to access a plurality of data objects from a particular data repository of the plurality of data repositories, the computer system comprising:
a storage medium that stores a plurality of metadata structures that each characterizes a configuration of multiple data objects in a respective data repository; and
a processing resource that is configured to identify and use a first metadata structure from the plurality of metadata structures to select one or more data objects from the particular data repository in response to an application request to access data objects from the particular data repository.

15. The computer system of claim 14, wherein the metadata structure characterizes, for each data repository, a configuration for how select data objects relate to other data objects in the plurality of data objects of that data repository.

16. The computer system of claim 14, wherein the first metadata structure includes a plurality of metadata items, and wherein the processing resource identifies a parameter in the request, uses the parameter to identify a first metadata item in the first metadata structure, and selects the one or more data objects using the first metadata item.

17. The computer system of claim 14, wherein the metadata structure includes a plurality of metadata items, and wherein the processing resource identifies a parameter in the request, uses the parameter to identify a first metadata item in the metadata structure, selects the one or more data objects using the first metadata item, and performs an operation specified in the request to access the data repositories on the selected one or more data objects.

18. The computer system of claim 14, wherein the first metadata structure identifies data objects in each data repository that are linked to other data objects.

19. The computer system of claim 14, wherein the first metadata structure identifies one or more linked data objects in the data repositories, the linked data objects referencing other data objects in the data repository, and wherein the first metadata structure identifies the other data objects references by the linked data objects.

20. The computer system of claim 14, wherein the first metadata structure identifies one or more linked data objects in the data repositories, the linked data objects referencing other data objects in the data repository, and wherein the first metadata structure identifies the other data objects references by the linked data objects, and wherein the processing resources identify an operation from the request to access the plurality of data repositories, and wherein the processing resources implement that operation on the linked data objects and the other data objects that reference the linked data objects.

21. The computer system of claim 14, wherein the first metadata structure identifies an auxiliary class of data objects in the plurality of data objects of each data repository, the auxiliary class of data objects including an auxiliary characteristic that modifies and is dependent on another characteristic of a data object in the auxiliary class of data objects.

22. The computer system of claim 14, wherein the first metadata structure identifies an auxiliary class of data objects in the plurality of data objects of each data repository, the auxiliary class of data objects including an auxiliary characteristic that modifies and is dependent on another characteristic of a data object in the auxiliary class of data objects, and wherein the processing resource identifies a parameter in the request, uses the parameter to identify the auxiliary class for one or more of the data repositories, and selects the one or more data objects that are in the auxiliary class.

23. The computer system of claim 14, wherein the first metadata structure identifies an auxiliary class of data objects in the plurality of data objects of each data repository, the auxiliary class of data objects including an auxiliary characteristic that modifies and is dependent on another characteristic of a data object in the auxiliary class of data objects, and wherein the processing resource identifies a parameter in the request, uses the parameter to identify the auxiliary class for one or more of the data repositories, selects the one or more data objects that are in the auxiliary class, and performs an operation identified by the request to access the data repositories on the one or more data objects in the auxiliary class.

24. The computer system of claim 14, wherein the first metadata structure identifies an inheritable attribute shared by data objects in an object class of each data repository.

25. The computer system of claim 14, wherein the first metadata structure identifies an inheritable attribute shared by data objects in an object class, and wherein the first metadata structure identifies a superior data object class and a subordinate object class for the object class having the inheritable attribute.

26. The computer system of claim 14, wherein the first metadata structure identifies an inheritable attribute shared by data objects in an object class, and identifies a superior data object class and a subordinate object class for the object class having the inheritable attribute, and wherein the processing resources are configured to identify the inheritable attribute from the request, to identify an operation specified in the request, to identify the object class having the inheritable attribute, and to apply the operation to the object class having the inheritable attribute.

27. A computer-readable medium carrying sequences of instructions for accessing data objects from a data repository from a plurality of data repositories that provide a plurality of data objects, the sequences of instructions including instructions for performing the steps of:

receiving a request to access data objects stored in a specified one of the plurality of data repositories, the request including a parameter that specifies the data objects;

wherein at least two of the plurality of data repositories are configured with different data objects and data object relationships;

identifying, based on the parameter, metadata that characterizes at least a portion of the data objects in the specified data repository, from a plurality of metadata that each characterizes a configuration for the data objects in a data repository;

retrieving the metadata that characterizes at least a portion of the plurality of data objects in the specified data repository;

generating, based on the metadata that characterizes at least a portion of the plurality of data objects in the specified data repository, a reconfigured request to access the data objects stored in the specified data repository; and using the reconfigured request, signaling a selection for one or more data objects from the specified data repository.

28. The computer medium of claim 27, further comprising instructions for performing the steps of:

modifying the one or more data objects from the specified data repository using the reconfigured request.

29. The computer-readable medium of claim 27, further comprising instructions for performing the steps of:

deleting the selected one or more data objects from the specified data repository using the reconfigured request.

30. The computer-readable medium of claim 27, further comprising instructions for performing the steps of:

creating one or more data objects using the reconfigured request, the data objects being created in the specified data repository according to the configuration for the data objects in the specified data repository.

31. A computer system for accessing data objects from a data repository from a plurality of data repositories that provide a plurality of data objects, the computer system comprising:

means for receiving a request to access data objects stored in a specified one of the plurality of data repositories, the request including a parameter that specifies the data objects;

wherein at least two of the plurality of data repositories are configured with different data objects and data object relationships;

means for identifying, based on the parameter, metadata that characterizes at least a portion of the data objects in the specified data repository, from a plurality of metadata that each characterizes a configuration for the data objects in a data repository;

means for retrieving the metadata that characterizes at least a portion of the plurality of data objects in the specified data repository;

means for generating based on the metadata that characterizes at least a portion of the plurality of data objects in the specified data repository, a reconfigured request to access the data objects stored in the specified data repository; and means for using the reconfigured request to signal a selection for one or more data objects from the specified data repository.

32. The method of claim 1, wherein the plurality of data repositories store hierarchical directories of data objects.

33. The method of claim 32, wherein the hierarchical directories are accessible using the Lightweight Directory Access Protocol (LDAP).

34. The computer-readable medium of claim 27, wherein the plurality of data repositories store hierarchical directories of data objects.

35. The computer-readable medium of claim 34, wherein the hierarchical directories are accessible using the Lightweight Directory Access Protocol (LDAP).

36. A system comprising:

a network interface that is coupled to a network for receiving one or more packet flows therefrom;

a processor;

one or more stored sequences of instructions which, when executed by the processor, cause the processor to perform receiving a request to access data objects stored in a specified one of a plurality of data repositories, the request including a parameter that specifies the data objects;

wherein at least two of the plurality of data repositories are configured with different data objects and data object relationships;

identifying, based on the parameter, metadata that characterizes at least a portion of the data objects in the specified data repository, from a plurality of metadata that each characterizes a configuration for the data objects in a data repository;

retrieving the metadata that characterizes at least a portion of the plurality of data objects in the specified data repository;

generating, based on the metadata that characterizes at least a portion of the plurality of data objects in the specified data repository, a reconfigured request to access the data objects stored in the specified data repository; and using the reconfigured request, signaling a selection for one or more data objects from the specified data repository.

37. A method for accessing a plurality of data repositories that each comprises a plurality of data objects, the method comprising:

receiving a request to access data objects stored in data repositories, the request including a parameter that specifies the data objects, wherein at least two of the plurality of directories are configured with different semantics, syntax, and data object relationships;

identifying, based on the parameter, a plurality of metadata that each characterizes at least a portion of a configuration for the data objects in respective data repositories;

retrieving the plurality of metadata;

creating, based on the plurality of metadata, reconfigured requests to access the data objects stored in the respective data repositories;

using the reconfigured requests to signal a selection for the data objects from the respective data repositories.

38. The method of claim 37, wherein the plurality of data repositories store hierarchical directories of data objects.

39. A computer-readable medium carrying sequences of instructions for accessing a plurality of data repositories that each comprises a plurality of data objects, the sequences of instructions which, when executed, cause one or more processors to perform the steps of:

receiving a request to access data objects stored in data repositories, the request including a parameter that specifies the data objects, wherein at least two of the plurality of directories are configured with different semantics, syntax, and data object relationships;

identifying, based on the parameter, a plurality of metadata that each characterizes at least a portion of a configuration for the data objects in respective data repositories;

retrieving the plurality of metadata;

creating, based on the plurality of metadata, reconfigured requests to access the data objects stored in the respective data repositories;

using the reconfigured requests to signal a selection for the data objects from the respective data repositories.

* * * * *